Figure 1:
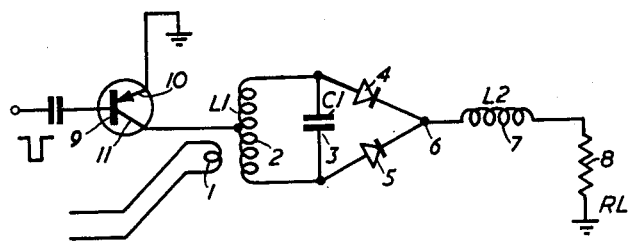

Oct. 20, 1964

W. S. MORTLEY ETAL 3,153,732

PULSE SAMPLING CIRCUIT EMPLOYING DIODE PAIR
CONNECTED TO TUNNEL CIRCUIT

Filed May 9, 1962

2 Sheets-Sheet 1

INVENTORS
Wilfrid Sinden Mortley
Stanley Frederick Clarke
and
Stuart Norman Radcliffe
BY Baldwin & Wight
ATTORNEYS

United States Patent Office 3,153,732
Patented Oct. 20, 1964

3,153,732
PULSE SAMPLING CIRCUIT EMPLOYING DIODE PAIR CONNECTED TO TUNNEL CIRCUIT
Wilfrid Sinden Mortley, Great Baddow, Stanley Frederick Clarke, Chelmsford, and Stuart Norman Radcliffe, Shenfield, England, assignors to The Marconi Company Limited, a British company
Filed May 9, 1962, Ser. No. 193,440
Claims priority, application Great Britain, May 10, 1961, 17,011/61
11 Claims. (Cl. 307—88.5)

This invention relates to sampling circuit arrangements and more particularly to circuit arrangements for taking short pulse-like samples from an oscillatory high frequency circuit such, for example, as a narrow band tuned filter circuit in which longer pulses of oscillatory energy occur. It is often required to take short pulse samples in this way notably (though not of course, exclusively) in certain radar equipments. An example of a radar system in which such sampling is required to be done is described in the specification accompanying the copending application of Wilfrid Sinden Mortley, Serial No. 40,956, filed July 5, 1960, for Pulsed Radar Systems, owned in common with the present application.

The at-present usual means for taking pulse-like samples from a filter or like high frequency oscillatory circuit comprises a rectifier connected to rectify voltage from said circuit, a condenser in which the rectified voltage is stored and a pulse operated valve, transistor, or other switch which samples the stored charge for measurement or other utilisation purposes. This known type of arrangement has several defects, the most important being that (1) it is difficult efficiently to utilise the energy from the filter without varying the loading on said filter during the period of excitation and such variation in loading is liable to produce undesirable and unpredictable variations in filter bandwidth; (2) even if the switch, when closed, takes substantially all the energy from the condenser—and it is possible that this may not happen—energy remaining in the filter will re-charge the condenser and such a charge may be retained until the next sampling operation, thus resulting in error; and (3) the output sample pulse tends to the exponential form whereas, in general, an approximation to a Gaussian shape is usually more desirable. The present invention seeks to avoid these defects.

According to this invention a sampling circuit arrangement for taking short pulse-like samples from a high frequency oscillatory circuit comprises a pair of rectifiers connected between a common point and points in said circuit at which occur high frequency oscillatory potentials in phase opposition and between which is a condenser which is part of said oscillatory circuit; and a series loop circuit extending from said common point back to said oscillatory circuit and including an inductance, an output resistance or load and a switch device which, when closed, completes the series loop circuit, the values of condenser, inductance and output resistance or load being so chosen that, when said switch device is closed, substantially all the oscillatory energy in the oscillatory circuit is extracted and produces a voltage pulse of required duration across said output resistance.

The switch device may be of any suitable known kind, e.g. a pulse operable valve or transistor.

Preferably the inductance, output resistance and switch device are connected in a series loop circuit between said common point and the mid-point of an inductance coil which forms part of a tuned oscillatory circuit and is in parallel with said condenser. Preferably also the two halves of the inductance coil are tightly coupled. If very tight coupling is used, the arrangement may be modified by replacing the condenser across said coil by two condensers, each of double the capacity of the single replaced condenser and each across a different half of the coil, or by a single condenser of four times the capacity of the replaced condenser and connected across one half only of the coil. These modifications are, however, not preferred. Shunt resistance may, if desired, be provided across the condenser or across each of the condensers (as the case may be) to control bandwidth.

In order to improve the shape of the sample pulse obtained, the output resistance may be shunted by a delay line or cable which is short-circuited or resistance shunted at its far end and adapted to reflect, across said output impedance, an inverted pulse delayed by approximately the time of growth of the initially produced pulse and of amplitude approximately equal to the amplitude of the initially produced pulse after twice the said time of growth. Where a high output impedance is not required the reflecting attenuating delay line may be replaced by a capacitor across the output resistance which may, if desired, be dimensioned to give critical damping. Further pulse shape improvement may be obtained by passing the output pulse from across the output resistance through a low pass filter as well known per se.

An important advantage of an arrangement in accordance with this invention is that it presents substantially infinite impedance to the output resistance or load for voltage of one polarity. If normally available types of semi-conductor diode are used as the rectifiers, the impedance presented to the load when the switch is open may be made acceptably large for voltages of the other polarity as well by providing means for applying suitable reverse bias to said diodes when the switch is open. In the preferred case in which the switch is a transistor which is normally blocked and which is arranged to be closed by applying a pulse to its base, the switch circuit being constituted by the emitter-collector circuit of said transistor, the aforesaid means for applying reversed bias may conveniently comprise a resistance in series with a bias source connected between earth and that electrode of the transistor which is connected to the high frequency oscillatory circuit.

Where semi-conductor diodes are employed as the rectifiers, their ability to rectify small amplitudes may be improved by providing means for applying predetermined forward bias thereto when the switch is closed. Again, where the switch is a transistor which is normally blocked and which is arranged to be closed by applying a pulse to its base, the switched circuit being constituted by the emitter-collector circuit of said transistor, the aforesaid means for applying forward bias may conveniently comprise a bias source in said switched circuit.

The invention is, of course, not limited to its application to the sampling of energy from a high frequency filter of the simple type consisting of a single tuned circuit and may be applied equally well to other, more complex, filters, e.g. to a filter comprising two critically coupled tuned circuits. In such a filter, as is well known, energy is periodically exchanged between the tuned circuits and if, therefore, an arrangement in accordance with this invention is used to take energy from one tuned circuit it will take substantially all the energy from the filter if the switch is closed at the correct times, i.e. at times when said one tuned circuit "carries" practically all the energy. With certain other types of filter and at certain times in the case of a critically coupled two-circuit filter, the energy is shared between the component circuits of the filter and if, therefore, only one component circuit of a filter is directly sampled at times when the energy is so shared, some energy will remain in one (or more) of the component circuits which are not directly campled and therefore, after sampling, the remaining energy will be transferred to the circuit which has been directly sampled and leave it "ringing"—in some cases as strongly as though it had not been sampled. If, for any reason, this is objectionable, it can be prevented by providing means in accordance with this invention for similarly sampling all the component circuits and passing the energy to a common load. A defect of this expedient is that it may result, in a good many cases, in unacceptable distortion of the frequency response of the filter and in such cases, therefore, it is preferred separately to dissipate (by damping) the energy of the component circuit or circuits which are not directly sampled. One convenient and simple way of doing this is to provide in series with each component circuit which is not directly sampled, a diode and (preferably) a resistance in series therewith and to connect all these series circuits (each comprising a component circuit, a resistance and a diode) in parallel with one another and in series with the switch device. With such an arrangement the diode self capacitance in the direct sampling circuit arrangement will be charged to the highest peak signal voltage set up across any of the component circuits which, in many cases, will include one component circuit producing a higher peak voltage than any of the others and having a greater bandwidth than the filter as a whole. This is not necessarily a defect, but if it is desired that the peak voltage to which the condenser in the direct sampling circuit is charged shall be independent of peak voltage occurring in any component circuit, this result may be achieved by providing a second switch device, operated simultaneously with the switch device of the sampling circuit arrangements and connected to complete the damped circuit or circuits each consisting of a diode, resistance and component circuit in series.

Figure 2:
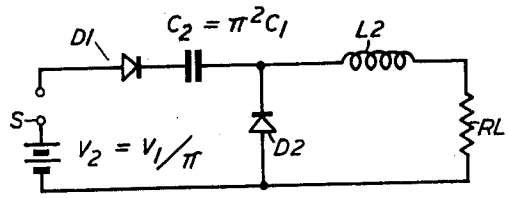
Figure 3:
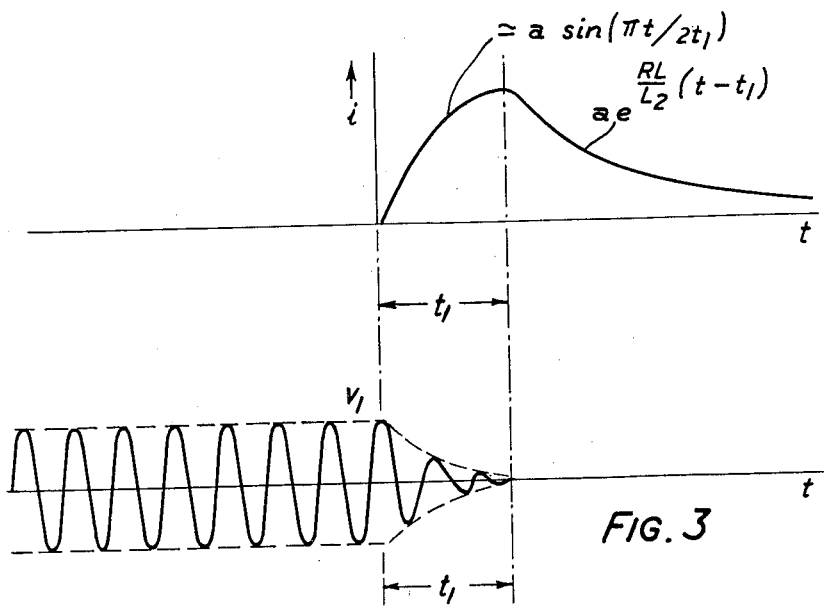

The invention is illustrated in and further explained in connection with the accompanying drawings in which FIGURES 1, 4, 5 and 6 are diagrams of different embodiments of this invention; FIGURE 2 is an explanatory equivalent circuit diagram related to FIGURE 1; and FIGURE 3 is an explanatory graphical figure.

Referring to FIGURE 1, high frequency signal energy in the form of long pulses is applied via a coil 1 to the centre-tapped coil 2 of a filter circuit in the simple form of said coil 2 in parallel with a condenser 3. Semiconductor diodes 4 and 5 connect opposite ends of the circuit 2–3 as shown to a common point 6 which is connected to earth through an inductance 7 in series with a load resistance 8. The centre tap on the coil 2 is connected to earth through a switch device in the form of a transistor which is closed, for taking a sample, by applying a short negative going pulse to its base 9, the emitter 10 being earthed and the collector 11 being connected to the centre tap on the coil 2. The values of the elements 2, 3, 7 and 8 will be referred to respectively as $L_1$, $C_1$, $L_2$ and $R_L$.

The operation is as follows: When the transistor is cut off—the normal condition—the circuit 2–3 is unloaded and signal energy builds up in the circuit 2–3. When the pulse is applied to the transistor, it renders the transistor conductive and in effect closes the switch constituted by said transistor. The diodes alternately conduct and current builds up in inductance 7 and load 8 until half the voltage across condenser 3 equals the voltage across load 8. Thereafter hte current begins to decrease but its flow continues due to the energy in inductance 7, first reducing the remaining oscillatory energy to zero and then causing both diodes to conduct together, symmetrical currents flowing in the two halves of the coil 2. During this part of the output pulse the current decay is exponential.

Ignoring double frequency oscillations (which, in any case, can be filtered out later) the circuit, looking back from inductance 7, appears, at the start of the sampling pulse, as though it were a charged condenser, of capacity $C_2$, supplied with a voltage $V_2$ which may be taken as the rectified mean of half the peak voltage $V_1$ across condenser 3. Thus $$V_2 = \frac{V_1}{\pi} \qquad (1)$$

Since the energy in the imaginary condenser of value $C_2$ is that in condenser 3

$$\tfrac{1}{2} C_1 V_1^2 = \tfrac{1}{2} C_2 V_2^2 = \tfrac{1}{2} C_2 \left(\frac{V_1}{\pi}\right)^2 \qquad (2)$$

whence $$\frac{C_2}{C_1} = \pi^2 \qquad (3)$$

Thus, over the time period $t+_1$, while the current is growing, the circuit behaves very much as would the circuit shown in FIGURE 2 after the switch S (which is the equivalent of the transistor) is closed. After this period $t_1$, diode $D_1$ (in the equivalent circuit) ceases to conduct and the current flow is transferred to $D_2$.

The resultant current $i$ through the load is, if the ratio $L_2/R_L$ is not too short in relation to the period $t_1$, approximately as represented in the upper part of FIGURE 3, the lower part of which shows the decay of voltage $V_1$ to the same scale of time $t$. During the period $t_1$ the curve of current $i$ (see the upper part of FIGURE 3) approximates to a quarter sinusoid, thereafter becoming approximately an exponential decay curve. For a specified time $t_1$ the product $L_2 C_1$ may be determined as follows:

$$w = 2\pi f = \pi 2 t_1 \qquad (4)$$

where $w$ is the frequency $f$ in angular measure.

$$L_2 C_2 \approx 1/w^2 = 4 t_1^2 / \pi^2 \qquad (5)$$

and, from Equation 3

$$L_2 C_1 \approx 4 t_1^2 / \pi^4 \qquad (6)$$

The pulse shape can be improved, as compared with that shown in the upper part of FIGURE 3 by providing across load 8 an attenuating reflecting line or cable (not shown) short-circuited at its far end and designed to produce across load 8 an inverted reflection delayed by approximately the time $t_1$ and attenuated to the amount the pulse shown in the upper part of FIGURE 3 will have decayed to at the end of a period $2t_1$. In this way the remainder of the decaying portion of the pulse is annulled. If the time constant $L_2/R_L$ is long the amount of attenuation required from the line is small and said line should have a surge impedance equal to $R_L$. For shorter time constants the attenuator could be designed as so-called "matching pad" and could have a surge impedance differing somewhat from $R_L$ through, in generall, it will be more convenient to match it to $R_L$ through a $\pi$ or T resistance network in accordance with well known technique. Alternatively, the short circuit at the end of the line could be replaced by a resistance R of value $$R = \tfrac{1}{2} R_L (1/A - 1) \qquad (7)$$

where $A = e^{-\frac{R_L}{L_2}(t_1)}$.

The appriximate laws of the rising and falling parts of the curve shown in the upper part of FIGURE 3 are marked in that figure.

Figure 4:
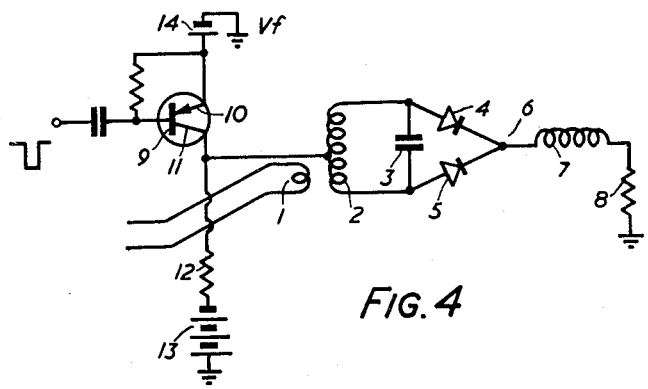

FIGURE 4 shows a modification of FIGURE 1 in which a resistance 12 in series with a potential source 13 is connected between the mid-point of coil 2 and earth for applying reverse bias to the diodes 4 and 5 when the switch is open. In this way the impedance presented to the load—already practically infinite for positive going pulses except when the sampling is taking place—may be increased for negative going pulses also. The resistance 12 limits the extra component of transistor current to an upper value dependent on the maximum transistor leakage current. One effect of this arrangement is to place on the diode capacitance a small constant charge which is released into the load by the sampling pulse. Without the bias there is a charge substantially proportional (assuming abrupt junction diodes) to the square root of the peak signal voltage and energy proportional to the cube of this, the amount of the charge depending on the area of the junction so that it may vary considerably as between different diodes.

FIGURE 4 also includes means for improving the diode rectification behaviour. Normal semi-conductor diodes have a small "built-in" voltage barrier inhibiting rectification at low amplitudes. In FIGURE 4 this defect is overcome by providing the voltage source 14 to supply forward bias to cancel out the effect of this small voltage barrier. Typical suitable values of forward bias are 0.2 volt for the case of germanium diodes and 0.6 volt for silicon diodes. Too high a value of forward bias will result in the output sampling pulse standing on a so-called "pedestal."

Figure 5:
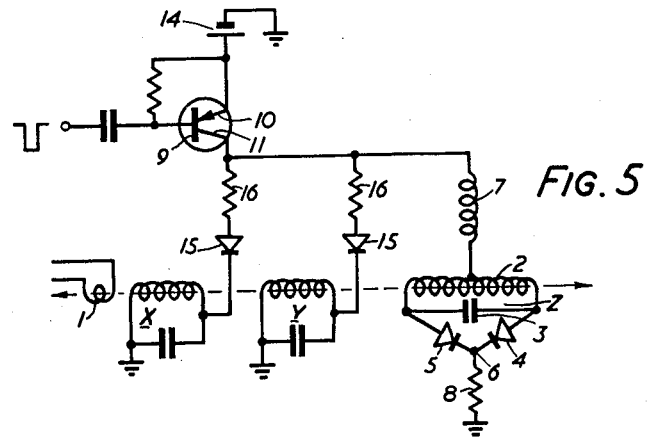

FIGURE 5 shows an embodiment in which the filter has a number of coupled component circuits—in the case shown, three. These are referenced X, Y and Z. A sampling circuit for only one component circuit—circuit Z—is provided. When sampling takes place from circuit Z there is still some energy remaining in the circuits X and Y and, in order to prevent this being transferred to circuit Z and thus leave it "ringing," means, operable simultaneously with sampling, are provided for damping out the energy in the circuits X and Y. This may be done by connecting each of these circuits in series with a diode 15 between earth and the collector of the switching transistor. Since if this is done all the dissipation of energy in circuit X or Y (as the case may be) will occur in the appropriate diode 15 and the transistor (which are low impedance devices), it is preferred to keep the current low by adding, in each case, a series resistance 16 dimensioned to give critical damping, i.e. in the case illustrated of resistance value ½ LC where L is the inductance and C the capacity of the tuned circuit. in cooperation with the central rod 14. At its outermost In the arrangement of FIGURE 5, because the same transistor-switch switches the sampling circuit arrangement and the damping circuits, the sampling diode capacitance becomes charged to the highest peak signal voltage occurring in any of the component circuits X, Y and Z. This may be avoided—if it is desired to do so—by using the modification shown in FIGURE 6 in which an additional switching transistor—that having the electrodes 109, 110 and 111—pulsed simultaneously with the other transistor, is used to switch the damping circuits in which the component circuits X and Y are situated. The resistances 17 in the base connections are dimensioned to ensure suitable sharing of base current during the sampling pulse.

Figure 6:
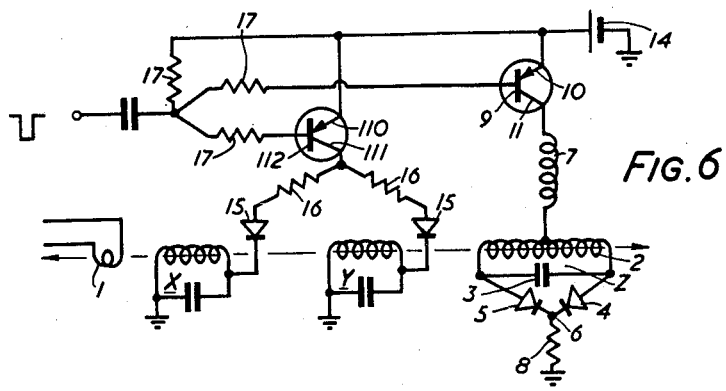

Obviously since the elements 7 and 8 are in series with the transistor-switch and the high frequency circuit—diode combination (2-3-4-5) in a loop circuit, the order in which these series parts of the circuit appear can be varied and, in FIGURES 5 and 6, the inductance 7 is shown between the switch and the tuned circuit instead of between that circuit and the load.

When a sampling arrangement in accordance with this invention is used to take short sample pulses in a radar system as described in the above-mentioned co-pending application Serial No. 40,956 it offers an additional advantage as compared to the use of known sampling arrangements. When known sampling arrangements are used for this purpose it is in practice necessary to smooth the long pulse to Gaussian-like form in order to reduce spurious responses known as "range side lobes" caused by Fourier transformation of the pulse shape. Such smoothing involves undesirable energy loss. With a sampling arrangement in accordance with this invention only the leading edge of the pulse need be smoothed so that energy loss is reduced—approximately halved.

We claim:

1. A sampling circuit arrangement for taking short pulse-like samples from a high frequency oscillatory circuit, said arrangement comprising a pair of rectifiers connected in like polarity between a common point and points in said circuit at which occur high frequency oscillatory potentials in phase opposition and between which is connected a condenser which is part of said oscillatory circuit; and a direct current series loop circuit extending from said common point back to said points between which the condenser is connected and including an inductance additional to the oscillatory circuit, and output resistance or load, and a switch device which, when closed, completes the series loop circuit, the values of condenser, inductance, and output resistance or load being so related that, when said switch device is closed, substantially all the oscillatory energy in the oscillatory circuit is extracted and produces a voltage pulse of required duration across said output resistance.

2. An arrangement as claimed in claim 1 wherein the switch device is a pulse operable valve.

3. An arrangement as claimed in claim 1 wherein shunt resistance is provided across the condenser to control bandwidth.

4. An arrangement as claimed in claim 1 wherein the output resistance is shunted by a delay line or cable which is short-circuited or resistance shunted at its far end and adapted to reflect, across said output resistance, an inverted pulse delayed by approximately the time of growth of the initially produced pulse and of amplitude approximately equal to the amplitude of the initially produced pulse after twice the said time of growth.

5. An arrangement as claimed in claim 1 wherein the output resistance is shunted by a capacitor.

6. An arrangement as claimed in claim 5 wherein the capacitor is so dimensioned as to produce critical damping.

7. An arrangement as claimed in claim 1 wherein the output pulse from across the output resistance is passed through a low pass filter.

8. An arrangement as claimed in claim 1 wherein the switch device is a pulse operable transistor.

9. An arrangement as claimed in claim 8 wherein the switch device is a transistor which is normally blocked and which is arranged to be closed by applying a pulse to its base, the switch circuit being constituted by the emitter-collector circuit of said transistor and wherein there is provided means for applying reverse bias comprising a resistance in series with a bias source connected between earth and that electrode of the transistor which is connected to the high frequency oscillatory circuit.

10. A sampling circuit arrangement for taking short pulse-like samples from a high frequency tuned oscillatory circuit, said arrangement comprising a pair of rectifiers connected in like polarity between a common point and points in said circuit at which occur high frequency oscillatory potentials in phase opposition and between which are connected a condenser and an inductance coil in parallel with one another, said condenser and said coil each forming part of said tuned oscillatory circuit; and a direct current series loop circuit extending between said common point and the mid-point of said inductance coil and including separate inductance means, an output resistance, and switch means for selectively closing and opening the series loop circuit, the values of condenser, inductance, and output resistance being so related that, when said switch means is closed, substantially all the oscillatory energy in the tuned oscillatory circuit is extracted and produces a voltage pulse of required duration across said output resistance.

11. An arrangement as claimed in claim 10 wherein the two halves of the inductance coil are tightly coupled.

References Cited in the file of this patent

UNITED STATES PATENTS 2,594,336    Mohr _____ Apr. 29, 1952
2,996,680    Barry et al. _____ Aug. 15, 1961